United States Patent
Dulla et al.

(10) Patent No.: US 12,235,863 B2
(45) Date of Patent: Feb. 25, 2025

(54) AUTOMATIC ESTIMATION OF COMPUTING RESOURCES FOR AUTO-DISCOVERY

(71) Applicant: International Business Machines Corporation, Armonk, NY (US)

(72) Inventors: Syam Dulla, Hyderabad (IN); Srinivas Mudigonda, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 75 days.

(21) Appl. No.: 17/588,444

(22) Filed: Jan. 31, 2022

(65) Prior Publication Data
US 2023/0244685 A1 Aug. 3, 2023

(51) Int. Cl.
G06F 16/25 (2019.01)
G06N 20/00 (2019.01)
H04L 41/16 (2022.01)

(52) U.S. Cl.
CPC ........... *G06F 16/254* (2019.01); *G06N 20/00* (2019.01); *H04L 41/16* (2013.01)

(58) Field of Classification Search
CPC .............................. G06F 16/254; G06N 20/00
See application file for complete search history.

(56) References Cited

U.S. PATENT DOCUMENTS

| | | | | |
|---|---|---|---|---|
| 2016/0078361 | A1* | 3/2016 | Brueckner | H04L 67/10 706/12 |
| 2019/0324810 | A1 | 10/2019 | Zhao | |
| 2021/0241241 | A1* | 8/2021 | Lokanath | G06Q 20/065 |
| 2022/0308903 | A1* | 9/2022 | Chakraborty | G06F 9/451 |
| 2022/0391380 | A1* | 12/2022 | Raghavan | G06F 21/31 |
| 2022/0413931 | A1* | 12/2022 | Chiang | G06F 9/5044 |

FOREIGN PATENT DOCUMENTS

| | | |
|---|---|---|
| CN | 110633946 A | 12/2019 |
| WO | 2021056708 A1 | 4/2021 |

OTHER PUBLICATIONS

Anonymous. "A Resource Intensive Database Query Can Easily Exhaust the Maximum Number of Available Cursors and Can Cause the Application to Fail." Published by IP.com on Mar. 12, 2020. 4 pages. https://priorart.ip.com/IPCOM/000261523.

Mell, et al., "The NIST Definition of Cloud Computing," Recommendations of the National Institute of Standards and Technology, U.S. Department of Commerce, Special Publication 800-145, Sep. 2011, 7 pgs.

* cited by examiner

*Primary Examiner* — Courtney Harmon
(74) *Attorney, Agent, or Firm* — Daniel J Blabolil

(57) ABSTRACT

A processor may initiate metadata discovery. The processor may identify an asset category and asset count. The processor may determine whether one or more assets can be imported. The processor may determine whether an import was successful. The processor may terminate the import.

20 Claims, 5 Drawing Sheets

AUTOMATIC ESTIMATION OF COMPUTING RESOURCES FOR AUTO-DISCOVERY

BACKGROUND

The present disclosure relates generally to the field of metadata discovery, and more specifically to automatically estimating computing resources for auto-discovery.

In metadata, metadata discovery (e.g., also known as metadata harvesting) is the process of using automated tools to discover semantics of a data element in datasets. This process usually ends with a set of mappings between the data source elements and a centralized metadata registry. Any metadata discovery, or import operations, are resource intensive.

SUMMARY

Embodiments of the present disclosure include a method, computer program product, and system for automatically estimating computing resources for auto-discovery. A processor may initiate metadata discovery. The processor may identify an asset category and asset count. The processor may determine whether one or more assets can be imported. The processor may determine whether an import was successful. The processor may terminate the import.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
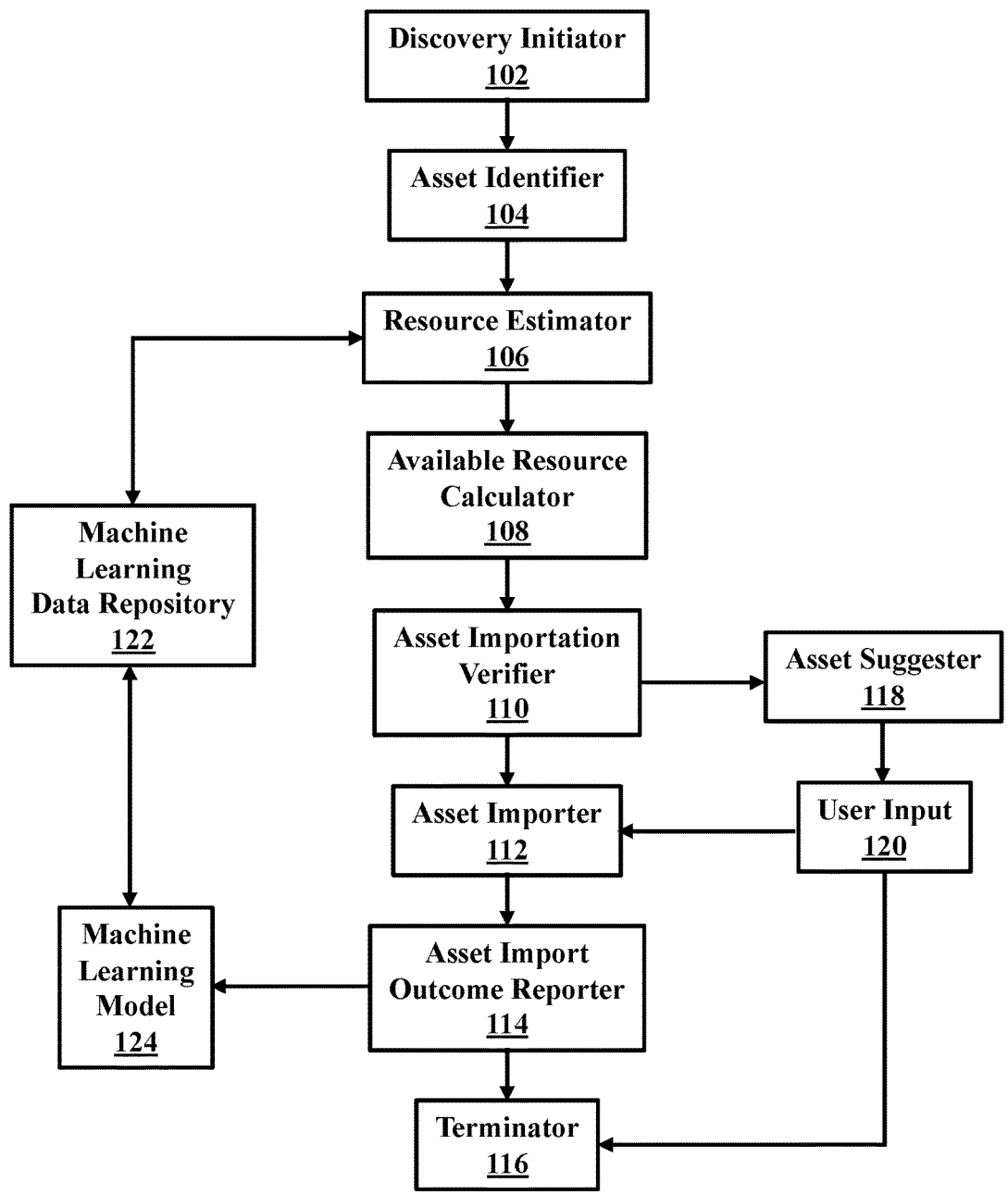
FIG. 1 illustrates a block diagram of an example system for automatically estimating computing resources for auto-discovery, in accordance with aspects of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of metadata discovery, and more specifically to automatically estimating computing resources for auto-discovery. While the present disclosure is not necessarily limited to such applications, various aspects of the disclosure may be appreciated through a discussion of various examples using this context.

In metadata, metadata discovery (e.g., also known as metadata harvesting) is the process of using automated tools to discover semantics of a data element in datasets. This process usually ends with a set of mappings between the data source elements and a centralized metadata registry. Any metadata discovery, or import operations, are resource intensive. If a system runs out of (computing) resources during execution, it could result in the waste of resources and failure of the operation(s). Oftentimes, it could happen that the user (e.g., customer) might trigger a metadata discovery, or import operations, without understanding the required resources required to complete the discovery operation(s). Accordingly, in such scenarios, presented herein is a solution (e.g., method, system, and computer program product) to provide an estimate of the required resources prior to the actual import operations, which helps in minimizing failures.

In some embodiments, the solution disclosed herein may intelligently estimate the time and the resources required for importing (or describing) different types of assets and may provide an approximation to a user during an initial discovery phase only based on the asset count. In some embodiments, this done by analyzing a current list of the selected assets and statistically comparing them with the historical data for the respective asset types. Accordingly, the actual import, or the description of the asset (which is a resource intensive operation), can be efficiently scheduled or carried out at an optimal time without blocking the resources for extended periods of time/unnecessarily.

In some embodiments, the solution disclosed herein, may be utilized as a part of discovery (e.g., before an actual import takes place). As a part of discovery, the solution allows a user to know where time is going to be spent in advance, by displaying folder size, number of files, number of data collections, etc., before going for an actual importation of assets; this information may be built through historical data. In some embodiments, based on system load, which the user may know in advance, the user may take a call when to trigger imports (e.g., folders/schemas), which may be extremely large in size rather than selecting a whole file system or database.

Additionally, in some embodiments, through the historical data of the number of imported assets, and also system load, the solution (as an application or utilizing an application function) can provide inputs on when the import, or the discovery operations, can be scheduled such that the imports can be completed timely (e.g., without a failure of an operation) to a successful import.

Referring now to FIG. 1, illustrated a block diagram of an example system 100 for automatically estimating computing resources for auto-discovery, in accordance with aspects of the present disclosure. As depicted, system 100 includes a discovery initiator 102, an asset identifier 104, a resource estimator 106, an available resource calculator 108, an asset importation verifier 110, an asset importer 112, an asset import outcome reporter 114, a terminator 116, an asset suggester 118, a user input 120, a machine learning data repository 122, and a machine learning model 124.

In some embodiments, the discovery initiator 102 initiates metadata discovery and communicates the initiation with the asset identifier 104, which identifies an asset category and an asset count. The asset identifier 104 communicates with the resource estimator 106, which estimates resources required for importing selected assets (e.g., as based on the asset category and asset count. In some embodiments, the resource estimator 106 may be in communication with the machine learning data repository 122, which may help provide input as to estimate of resources (as based on historical input, etc.) for importing selected assets (e.g., as needed for discovery, performing an operation, etc.).

In some embodiments, the resource estimator 106 communicates with the available resource calculator 108, which calculates available resources on a select device (e.g., system, network, etc.) that is to perform the discovery or other operations in regard to the assets to be imported. In some embodiments, the available resource calculator 108 communicates with the asset importation verifier 110, which determines if the selected assets can be imported to the select device.

If the asset importation verifier 110 determines that the selected assets can be imported, the asset importation verifier 110 communicates with the asset importer 112, which imports the selected assets to the select device. In some embodiments, if the asset importation verifier 110 determines that the selected assets cannot be imported, the asset importation verifier 110 communicates with the asset suggester 118, which suggests assets that can be imported (and which would not lead to a termination of importation as a whole, and which may allow for select operations to continue to be performed).

In some embodiments, the asset suggester 118, which may communicate with a user via a user interface and receive user input 120. The user input 120 may determine if the user accepts or declines to use the suggested assets. If the user input 120 determines that the user declines the suggested assets, the user input 120 is communicated with the terminator 116 and discovery and/or importation of assets is terminated. If the user input 120 determines that the user accepts the suggested assets, the user input 120 is communicated with the asset importer 112.

In some embodiments, the asset importer 112 communicates with the asset import outcome reporter 114, which determines if an import was successful or not. If the asset import outcome reporter 114 determines that the import was successful, the asset import outcome reporter 114 reports the success to the terminator 116, and discovery and/or importation of other assets is terminated. If the asset import outcome reporter 114 determines that the import was unsuccessful, the asset import outcome reporter 114 reports the fail to the machine learning model 124, which utilizes information about the fail to learn and increase success in subsequent/future discovery initiations. In some embodiments, the machine learning model 124 communicates with the machine learning data repository 122, where information about the failure or the machine learning model 124's new nexus regarding the failure is stored and can be utilized by the resources estimator 106 or for future iterations of the machine learning model 124.

In regard to FIG. 1, and the disclosed solution as a whole, the proposed solution is associated with metadata discovery, which is a prior step before an actual metadata import process starts. As part of discovery, a user will come to know about folder/database/schema sizes in terms of asset count and the assets' associated category/categories.

For example, a table in a database/schema may have the following assets: table name, owner, columns information (e.g., col1, col2, colN), data-type information for each column and keys information (e.g., foreign keys and primary keys associated with a table). In some embodiments, all these attributes form an asset-count of a table.

In some embodiments, there could be considerable difference between Relational Database Management System (RDBMs) and FileSystem in metadata retrieval process. So, asset-category (database/file-system) should be maintained as well. In order for this to be accomplished by the disclosed solution, the machine learning model (e.g., machine learning model 124) will be trained with the information about estimated resources (e.g., as provided by the resource estimator 106 and/or through the machine learning data repository 122) required to complete an import for the specified asset count and asset category (e.g., as provided by the asset identifier 104).

In some embodiments, the proposed solution calculates the available resources dynamically (e.g., as provided by the available resource calculator 108) at this point of time (e.g., during the estimation or at discovery initiation). In some embodiments, based on information that would be obtained from the asset count and system resources available at that time, a user can make the decision (e.g., via user input 120) of enabling the proposed solution (e.g., as an application, on a user device, etc.) to proceed with an import or not. In the case of if assets can be imported, the user can proceed to the import step and the assets would be imported (e.g., as provided by the asset importer 112.

In some embodiments, if the import fails for some reason, the statistics captured during the import would be fed back into the training model (e.g., the machine learning model 124) to enhance training data (e.g., of/in the machine learning data repository 122). In some embodiments, if the assets cannot be imported because of the available resources on the device, and the user accepts a partial import, then the machine learning model 124 in the system 100 may suggest the following: what are the schemas/folders that can be selected as part of the partial import scenario that leads to a successful import; and/or based on acceptance of the partial import, the user can go ahead with this partial import or customize the import with necessary metadata that leads to a successful completion of a metadata import process.

Figure 2:
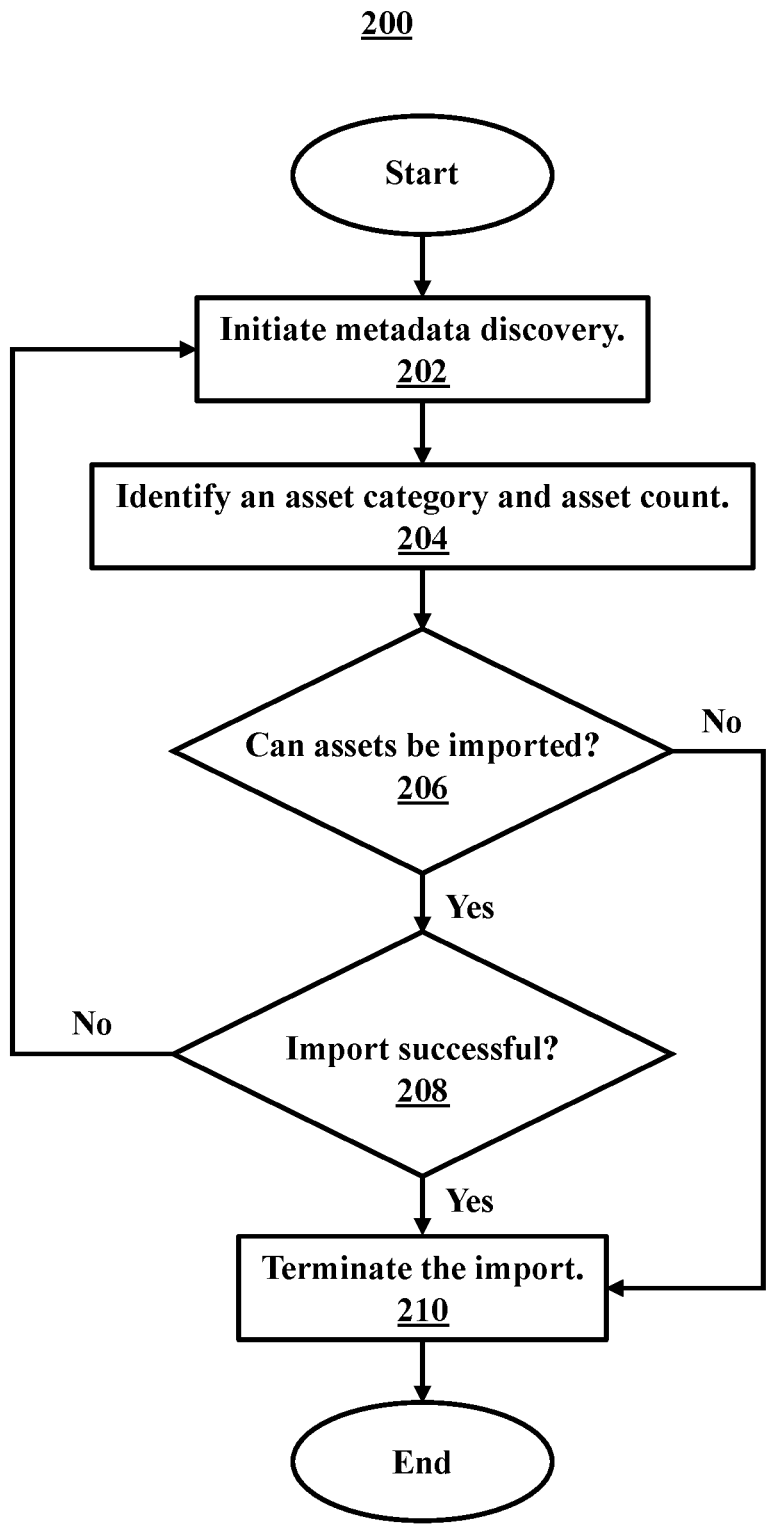
FIG. 2 illustrates a flowchart of an example method for automatically estimating computing resources for auto-discovery, in accordance with aspects of the present disclosure.

Referring now to FIG. 2, illustrated is a flowchart of an example method 200 for automatically estimating computing resources for auto-discovery, in accordance with aspects of the present disclosure. In some embodiments, the method 200 may be performed by a processor (e.g., of system 100 of FIG. 1, etc.).

In some embodiments, the method 200 begins at operation 202, where the processor initiates metadata discovery. The method 200 may then proceed to operation 204, where the processor identifies an asset category and asset count (associated with assets related to the metadata). The method 200 may then proceed to decision block 206, where the processor determines whether (e.g., select/one or more) assets can be imported.

If, at decision block 206, it is determined that the assets cannot be imported, the method 200 proceeds to operation 210. At operation 210, the processor terminates the import. In some embodiments, after operation 210, the method 200 may end. If, at decision block 206, it is determined that the assets can be imported, the method 200 proceeds to decision block 208, where the processor determines whether an import (of assets) was successful.

If, at decision block 208, it is determined that the import was successful, the method 200 proceeds to operation 210. At operation 210, the processor terminates the import. In some embodiments, after operation 210, the method 200 may end. If, at decision block 208, it is determined that the import was unsuccessful, the method 200 proceeds to back operation 202 and the method 200 may continue in a loop until an import is successful.

In some embodiments, discussed below, there are one or more operations of the method 200 not depicted for the sake of brevity and which are discussed throughout this disclosure. Accordingly, in some embodiments, the processor may estimate resources required for importing the one or more assets. The estimating of the resources required for importing may include the processor utilizing machine learning data (which may be/or be house in a that can be in a machine learning data repository) associated with resource consumption by the one or more assets. The processor may calculate available resources.

In some embodiments, determining whether the one or more assets can be imported may include the processor identifying that the one or more assets can be imported and importing the one or more assets. In some embodiments, determining whether the one or more assets can be imported may include the processor identifying that the one or more assets cannot be imported. The processor may recommend, automatically, another one or more assets that can be imported. The processor may identify, from user input, that the another one or more assets are accepted for import. The processor may import the another one or more assets. In some embodiments the processor could identify/determine that the user input does not approve the import and the import would be terminated.

In some embodiments, determining whether the import was successful may include the processor identifying that the import was unsuccessful and sending information associated with the import being unsuccessful to a machine learning model. In some embodiments, the processor may train the machine learning model with the information associated with the import being unsuccessful. The processor may update the machine learning model and store the information associated with the import being unsuccessful in a machine learning repository.

In some embodiments, the processor may update, based on input from the machine learning model, a schema associated with the one or more assets. The processor may import, partially, assets of the one or more assets. The partially imported assets of the one or more assets may lead to a successful import.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
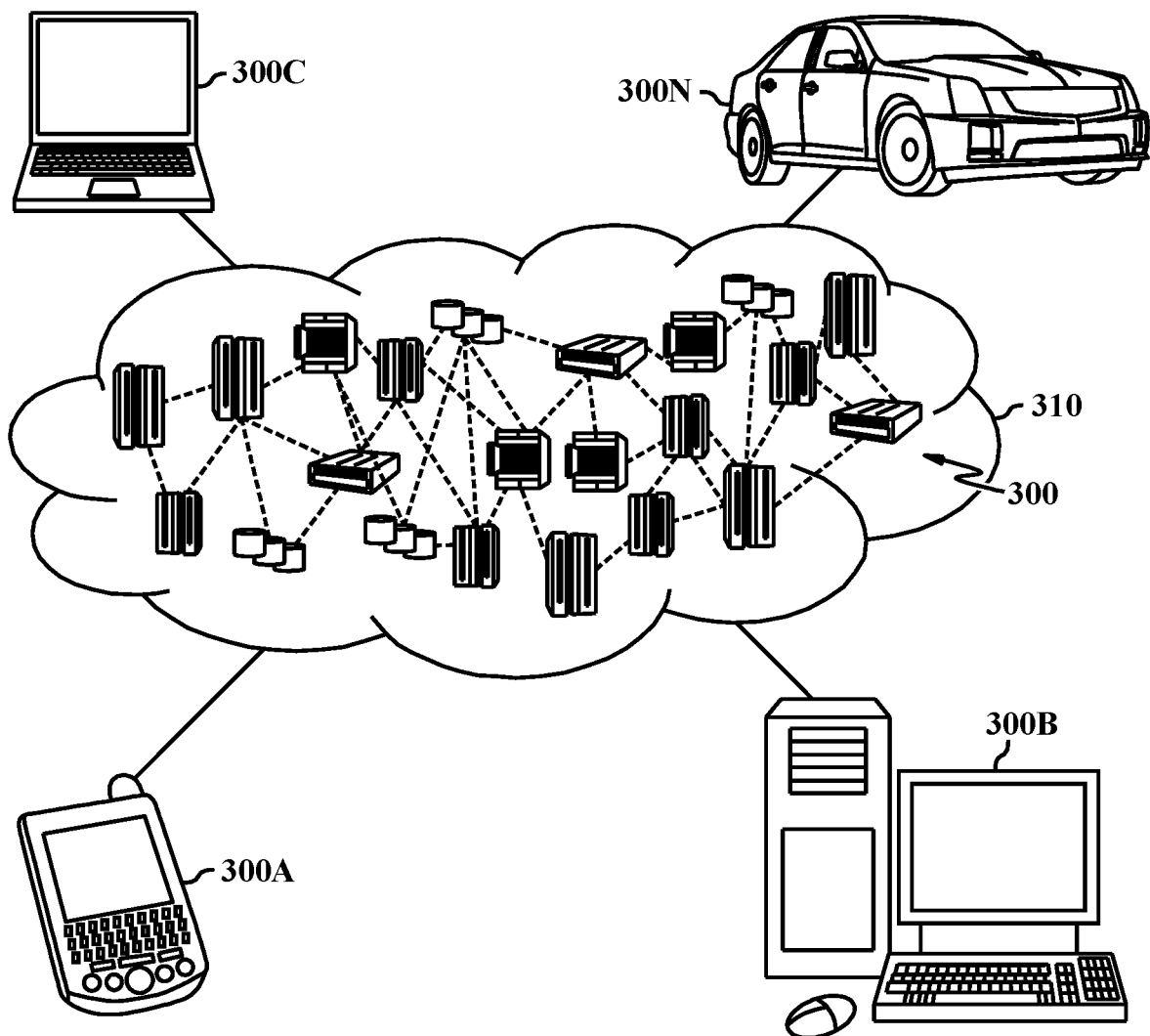
FIG. 3A illustrates a cloud computing environment, in accordance with aspects of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
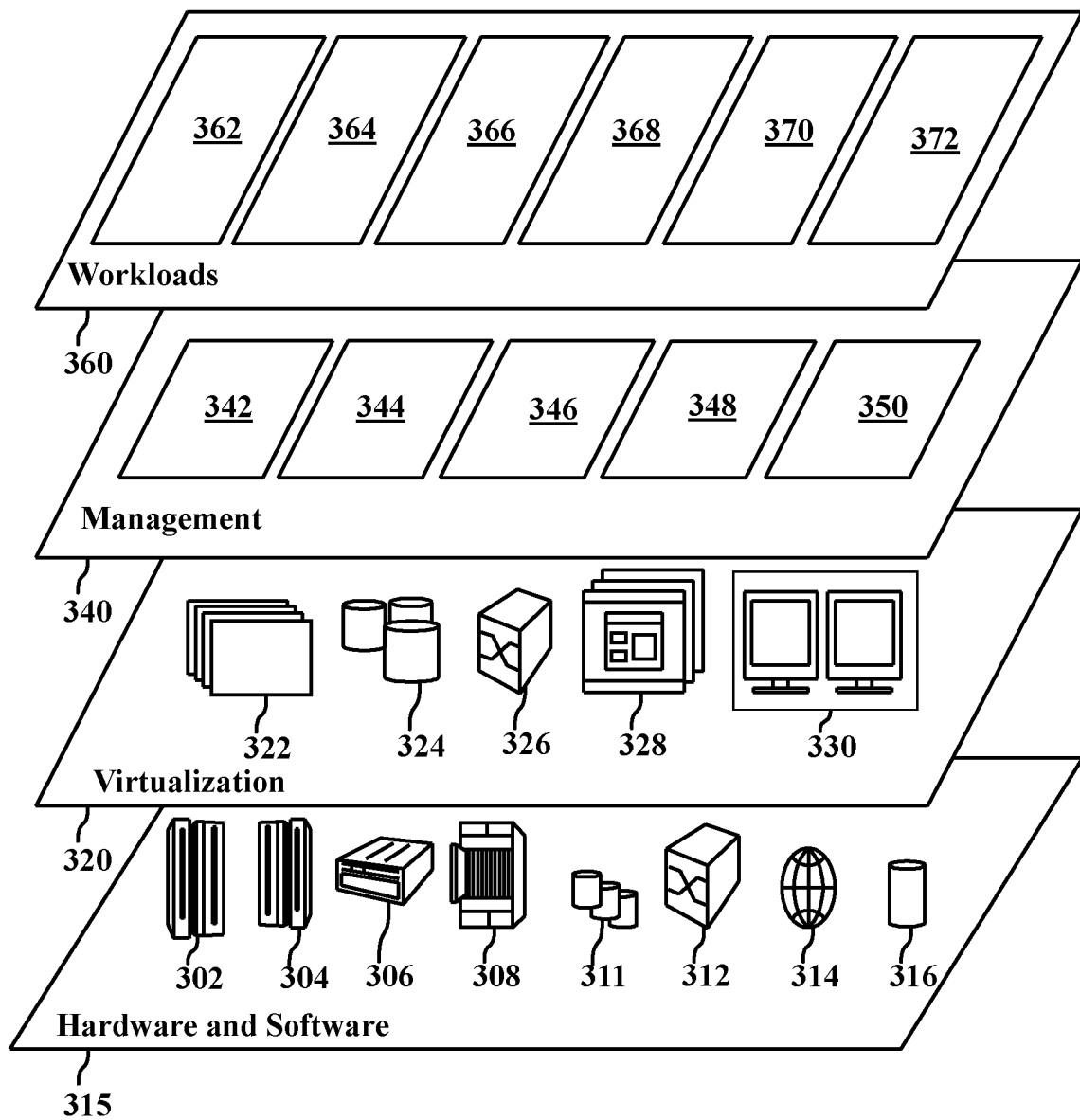
FIG. 3B illustrates abstraction model layers, in accordance with aspects of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and automatically estimating computing resources for auto-discovery 372.

Figure 4:
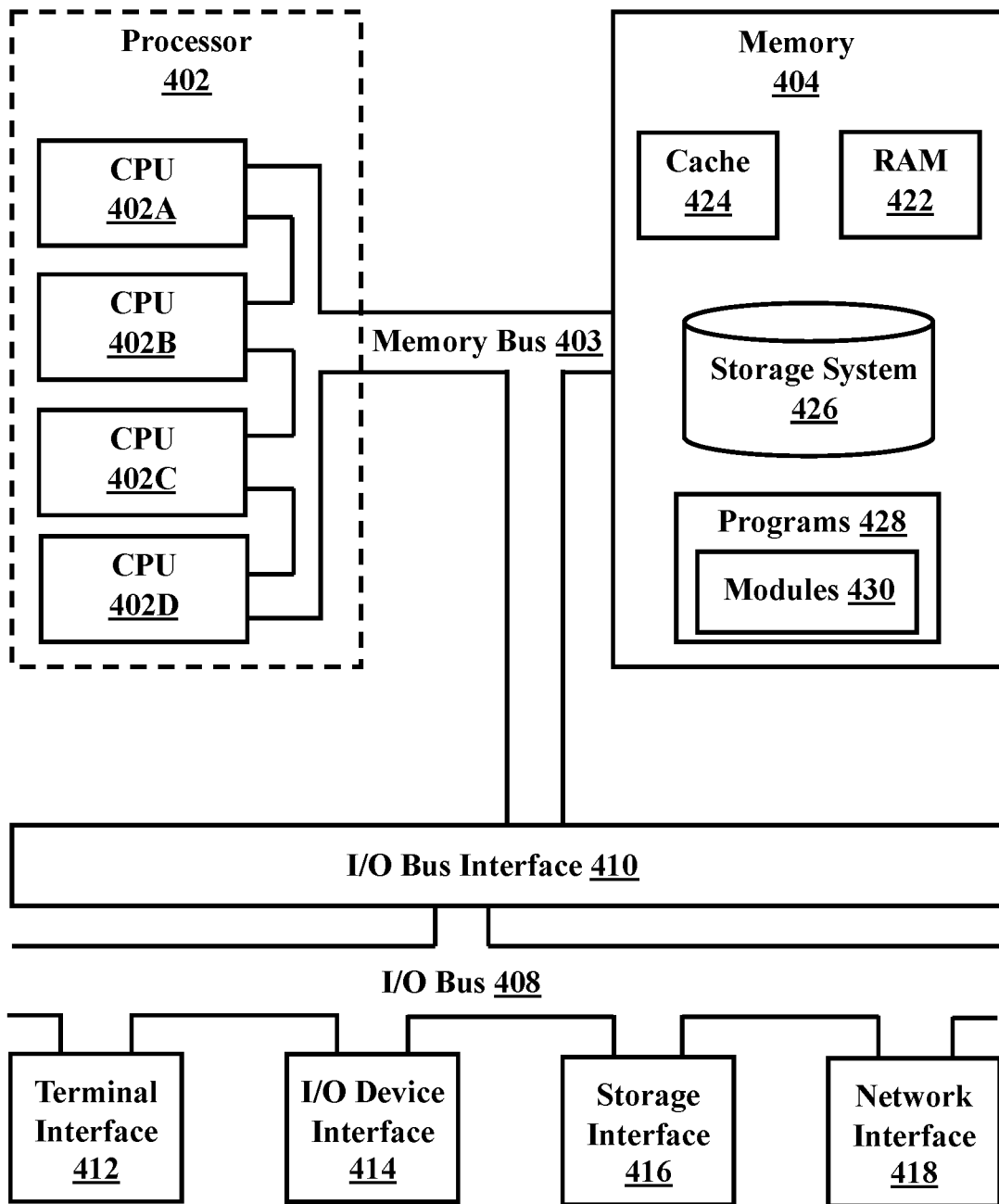
FIG. 4 illustrates a high-level block diagram of an example computer system that may be used in implementing one or more of the methods, tools, and modules, and any related functions, described herein, in accordance with aspects of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A system for automatically estimating computing resources for auto-discovery, the system comprising:
   a memory; and
   a processor in communication with the memory, the processor being configured to perform operations comprising:
   initiating metadata discovery;
   identifying an asset category and asset count associated with one or more assets related to the metadata;
   training a machine learning model using information related to estimated resources, as provided by a resource estimator and/or through a machine learning data repository, to provide an estimate of required resources for importing the one or more assets;
   incorporating the trained machine learning model in the system;
   estimating an amount of time and resources required for importing the one or more assets using the trained machine learning model, prior to a performance of one or more import operations;
   determining whether the one or more assets can be imported to a select device based on calculated available resources on the select device and the estimated amount of time and resources required for the importing of the one or more assets;
   determining whether the one or more import operations were successful; and
   terminating the one or more import operations upon the determination that the one or more import operations were successful.

2. The system of claim 1, wherein estimating the amount of time and the resources required for importing the one or more assets includes:
   utilizing machine learning data associated with resource consumption by the one or more assets; and
   calculating available resources on the select device that is to perform the one or more import operations.

3. The system of claim 1, wherein determining whether the one or more assets can be imported includes:
   identifying that the one or more assets can be imported; and
   importing the one or more assets.

4. The system of claim 1, wherein determining whether the one or more assets can be imported includes:
   identifying that the one or more assets cannot be imported;
   recommending, automatically, another one or more assets that can be imported;
   identifying, from user input, that the another one or more assets are accepted for import; and
   importing the another one or more assets.

5. The system of claim 1, wherein determining whether the one or more import operations were successful includes:
   identifying that the one or more import operations were unsuccessful; and
   sending information associated with the one or more import operations being unsuccessful to the machine learning model.

6. The system of claim 5, wherein the processor is further configured to perform operations comprising:
   training the machine learning model with the information associated with the one or more import operations being unsuccessful;
   updating the machine learning model; and
   storing the information associated with the one or more import operations being unsuccessful in a machine learning repository.

7. The system of claim 6, wherein the processor is further configured to perform operations comprising:
   updating, based on input from the machine learning model, a schema associated with the one or more assets; and importing, partially, assets of the one or more assets, wherein the partially imported assets of the one or more assets lead to a successful import.

8. A computer-implemented method for automatically estimating computing resources for auto-discovery, the method comprising:
  initiating metadata discovery;
  identifying an asset category and asset count associated with one or more assets related to the metadata;
  training a machine learning model using information related to estimated resources, as provided by a resource estimator and/or through a machine learning data repository, to provide an estimate of required resources for importing the one or more assets;
  incorporating the trained machine learning model in the system;
  estimating an amount of time and resources required for importing the one or more assets using the trained machine learning model, prior to a performance of one or more import operations;
  determining whether the one or more assets can be imported to a select device based on calculated available resources on the select device and the estimated amount of time and resources required for the importing of the one or more assets;
  determining whether the one or more import operations were successful; and
  terminating the one or more import operations upon the determination that the one or more import operations were successful.

9. The computer-implemented method of claim 8, wherein estimating the amount of time and the resources required for importing the one or more assets includes:
  utilizing machine learning data associated with resource consumption by the one or more assets; and
  calculating available resources on the select device that is to perform the one or more import operations.

10. The computer-implemented method of claim 8, wherein determining whether the one or more assets can be imported includes:
  identifying that the one or more assets can be imported; and
  importing the one or more assets.

11. The computer-implemented method of claim 8, wherein determining whether the one or more assets can be imported includes:
  identifying that the one or more assets cannot be imported;
  recommending, automatically, another one or more assets that can be imported;
  identifying, from user input, that the another one or more assets are accepted for import; and
  importing the another one or more assets.

12. The computer-implemented method of claim 8, wherein determining whether the one or more import operations were successful includes:
  identifying that the one or more import operations were unsuccessful; and
  sending information associated with the one or more import operations being unsuccessful to the machine learning model.

13. The computer-implemented method of claim 12, further comprising:
  training the machine learning model with the information associated with the one or more import operations being unsuccessful;
  updating the machine learning model; and
  storing the information associated with the one or more import operations being unsuccessful in a machine learning repository.

14. The computer-implemented method of claim 13, further comprising:
  updating, based on input from the machine learning model, a schema associated with the one or more assets; and
  importing, partially, assets of the one or more assets, wherein the partially imported assets of the one or more assets lead to a successful import.

15. A computer program product for automatically estimating computing resources for auto-discovery comprising a computer readable storage medium having program instructions embodied therewith, the program instructions executable by a processor to cause the processor to perform operations, the operations comprising:
  initiating metadata discovery;
  identifying an asset category and asset count associated with one or more assets related to the metadata;
  training a machine learning model using information related to estimated resources, as provided by a resource estimator and/or through a machine learning data repository, to provide an estimate of required resources for importing the one or more assets;
  incorporating the trained machine learning model in the system;
  estimating an amount of time and resources required for importing the one or more assets using the trained machine learning model, prior to a performance of one or more import operations;
  determining whether the one or more assets can be imported to a select device based on calculated available resources on the select device and the estimated amount of time and resources required for the importing of the one or more assets;
  determining whether the one or more import operations were successful; and
  terminating the one or more import operations upon the determination that the one or more import operations were successful.

16. The computer program product of claim 15, wherein estimating the amount of time and the resources required for importing the one or more assets includes:
  utilizing machine learning data associated with resource consumption by the one or more assets; and
  calculating available resources on the select device that is to perform the one or more import operations.

17. The computer program product of claim 15, wherein determining whether the one or more assets can be imported includes:
  identifying that the one or more assets can be imported; and
  importing the one or more assets.

18. The computer program product of claim 15, wherein determining whether the one or more assets can be imported includes:
  identifying that the one or more assets cannot be imported;
  recommending, automatically, another one or more assets that can be imported;
  identifying, from user input, that the another one or more assets are accepted for import; and
  importing the another one or more assets.

19. The computer program product of claim 15, wherein determining whether the one or more import operations were successful includes:

identifying that the one or more import operations were unsuccessful; and sending information associated with the one or more import operations being unsuccessful to the machine learning model.

20. The computer program product of claim 19, wherein the processor is further configured to perform operations comprising:

training the machine learning model with the information associated with the one or more import operations being unsuccessful;

updating the machine learning model; and storing the information associated with the one or more import operations being unsuccessful in a machine learning repository.

\* \* \* \* \*